United States Patent Office 3,373,189
Patented Mar. 12, 1968

3,373,189
VAPOR PHASE PROCESS FOR PRODUCING VINYL
ACETATE FROM ETHYLENE
David W. Lum, Cincinnati, Ohio, assignor to National
Distillers and Chemical Corporation, New York, N.Y.,
a corporation of Virginia
No Drawing. Filed July 9, 1965, Ser. No. 470,910
8 Claims. (Cl. 260—497)

The present invention relates to a novel process for the preparation of unsaturated organic esters. More particularly, the invention pertains to a novel process wherein alkenes are reacted with oxygen in the presence of certain catalysts to produce unsaturated organic esters such as vinyl acetate.

In recent years a number of processes have been proposed for the production of vinyl acetate from ethylene as well as for other unsaturated organic esters from corresponding alkenes. For purposes of convenience, the prior art processes as well as the process of this invention will be described primarily with reference to the use of ethylene as the starting material in the preparation of vinyl acetate, the unsaturated ester which is commercially most important. The prior art processes have generally involved the reaction of ethylene, acetic acid and oxygen in liquid phase in the presence of a palladium metal-containing catalyst. In British Patent No. 976,613 a recent innovation is disclosed wherein the reaction is carried out with all of the reactants being present in the vapor phase. More specifically, this process comprises passing a reaction mixture containing ethylene, acetic acid and oxygen (with air as a possible alternative) in vapor form over a solid catalytic mass. The vinyl acetate product is recovered overhead, and then separated from the reaction product mixture including unreacted feed materials. The disclosed catalysts may be any member of the platinum or palladium group of metals, oxides or salts thereof. A common feature of each of the prior art processes is the requirement that acetic acid, or other organic carboxylic acid depending upon the product desired, be present in the feed mixture. Consequently, the preparation of vinyl acetate, for example, requires an initial reaction mixture consisting of ethylene, acetic acid and a source of oxygen.

One object of the present invention is to provide a novel process for effectively preparing unsaturated organic esters from alkenes.

Another object of the present invention is to provide a process for the production of unsaturated organic esters from alkenes which does not require the presence of an organic carboxylic acid in the initial reaction mixture.

A further object of the present invention is to provide a vapor phase process for the production of unsaturated organic esters from a feed mixture consisting of an alkene and an oxygen-containing gas.

A still further object of the present invention is to provide a vapor phase process for the preparation of vinyl acetate from ethylene and oxygen in the absence of acetic acid in the initial feed mixture.

These and other objects of the present invention will become readily apparent from the ensuing description and illustrative embodiments.

In accordance with the present invention, it has now been found that unsaturated organic esters can be prepared directly from alkenes and an oxygen-containing gas by a vapor phase process comprising contacting the reactants in the presence of a prescribed catalyst combination at elevated temperatures. The process will be described hereinafter with respect to the preparation of vinyl acetate and the use of oxygen itself as the oxygen-containing gas. In general, the process is carried out by passing the ethylene gas containing the oxygen gas over or through a mixed catalyst system, obtaining a gaseous mixture of reaction products, and then separating the vinyl acetate therefrom by conventional procedures such as distillation and the like. The amount of oxygen employed will range from about 5 to 40%, preferably from about 12 to 25%, by volume based on the ethylene. The same percentages of oxygen will be employed when alkenes other than ethylene are employed as the starting material in the preparation of corresponding unsaturated organic esters. In accordance with another feature of this invention, it has been found advantageous to add a selectively small or catalytic amount of water to the aforementioned reacting gases. When employed, the amount of water will range from about 2 to 10%, preferably from about 3 to 5%, by volume based on the total volume of the alkene and the oxygen-containing gases.

The preferred method of practicing the present invention comprises sequentially passing the gaseous reaction mixture over a first catalyst bed and then over a second catalyst bed. The first catalyst bed contains a palladium group or platinum group metal-containing catalyst supported on carbon. The use of a palladium group metal-containing catalyst is preferred and illustrative catalysts include palladium metal, palladous acetate, palladous propionate, palladous chloride, palladous oxide, palladous bromide, ruthenium chloride, rhodium oxide and the like. The use of palladium metal supported on carbon is especially preferred. These supported catalysts may be obtained commercially or may be prepared by an convenient means, such as by dissolving the metal salt in a suitable solvent, e.g., water, adding the support, and then evaporating the solvent with heat under vacuum. Only catalytic amounts of the catalyst need be employed and specific amounts may, for example, vary from about 0.01 to 10% by weight based on the weight of the support, and preferably from about 1 to 5% by weight.

The second catalyst bed contains a palladium group or a platinum group metal-containing catalyst support on alumina. The metal-containing catalyst can be selected from the above described list, with the use of a palladium group metal-containing catalyst being preferred. An alumina supported palladium metal catalyst is especially preferred. For most purposes, it is also desirable to activate the second catalyst with minor amounts of an alkali metal or alkaline earth metal salt of a weak acid or hydroxide. Such promoters include sodium acetate, sodium hydroxide, calcium acetate, lithium acetate, sodium metaborate, disodium acid phosphate, and the like. The use of sodium acetate is preferred. The second catalyst may also be obtained commercially or prepared as described above. Only catalytic amounts of this catalyst need also be employed, and specific amounts may, for example, vary from about 0.1 to 20% by weight based on the weight of the support, and preferably from about 0.5 to 10% by weight.

Another aspect of this invention comprises the further activation of either the first or second catalyst systems by use of salts of metals of variable valence such as vanadium, cobalt, chromium, manganese, lead, etc. These salts can either be admixed with the aforedescribed catalysts or deposited on separate supports such as alumina, carbon, silicate, carbonate, etc. These other metal salts are illustrated by chromic oxide, manganous acetate, ferric chloride, cupric chloride, cobaltous chloride, cobaltous acetate, vanadyl sulphate, lead acetate, gold chloride, nickel chloride, and the like. They are employed, if desired in amounts which need only be catalytic. In general, they will vary from about 0.5 to 10% by weight based on the weight of the support. Of the two catalyst systems, it is especially desirable to promote in this manner the first one. Of the various variable valence metal promoters, the use of cupric and ferric metal salts, singly or in combination, is preferred.

As above described, the first and second catalyst beds are preferably placed in sequence such that the ethylene and oxygen gaseous mixture initially contacts the carbon-supported catalyst and then contacts the alumina-supported catalyst. An alternate arrangement would be to intimately mix the various catalysts either in a portion of or throughout the entire catalyst bed. It will be understood, however, that the use of the sequential contact procedure is especially preferred and leads to the most desirable results.

Other operating conditions employed in carrying out the process of this invention include a reaction temperature, throughout both catalyst beds, which may range from about 110° to 250° C. and a reaction pressure which may range from about atmospheric to 400 p.s.i. Preferred reaction conditions are temperatures within the range of about 120° to 200° C., and pressures within the range of about atmospheric to 100 p.s.i. Neither the reaction temperatures or pressures are critical features of this invention.

The oxygen required for the present process may be used either in pure form or as an oxygen-containing gas such as air. The term "oxygen-containing gas," as used throughout this specification and claims is intended to encompass both pure oxygen and any other source of oxygen such as air.

The alkenes which may be employed as starting materials in the process of this invention can have from about 2 to 16 carbon atoms, and preferably from about 2 to 8 carbon atoms, per molecule. In addition to ethylene, which is the especially preferred starting material, the alkenes may be selected from the group consisting of propylene, butene-1, isobutylene, hexene-1, iso-octene, diisobutylene, styrene, etc.

The process of this invention has a number of important advantages over the known prior art process. To begin with, it affords the advantages of a vapor phase reaction in contrast to a liquid phase. Secondly, it provides certain economic and operating advantages over the known vapor phase processes for the production of unsaturated organic esters insofar as it eliminates the necessity of continuously furnishing an organic carboxylic acid such as acetic acid as a required component of the initial reaction mixture. It eliminates the cost of the organic carboxylic acid, since the product is entirely derived from the olefin. It also eliminates the need to employ expensive or complicated separation procedures for recovering the unsaturated organic ester product.

The invention will be more fully understood by reference to the following illustrative embodiment.

EXAMPLE

Ethylene containing 15% by volume of oxygen was saturated with water vapor at a temperature of about 30°–50° C. The resulting mixture was initially passed over a solid catalyst bed containing 1% by weight of palladium supported on carbon and activated with 6% by weight of cupric chloride and 3% by weight of ferric chloride. Immediately thereafter the gaseous reaction mixture was passed over a catalyst bed containing 1% by weight of palladium supported on alumina and activated by 1.6% by weight of anhydrous sodium acetate. The resulting gaseous reaction product mixture was recovered, and vinyl acetate was isolated therefrom by vapor phase chromatography. The vinyl acetate was identified by means of mass spectroscopy.

The above data show that the process of this invention can be effectively utilized to produce unsaturated organic esters such as vinyl acetate from an initial reaction mixture containing ethylene and oxygen.

The exact theory behind the reaction and especially the criticality of employing a combination of catalysts, e.g., palladium metal, which are supported by different inert carriers is not fully understood at this time. It is known, however, that if the same carrier is employed in both catalyst beds, vinyl acetate will not be produced. The function of the water or water vapor in the reaction mixture is also unknown at this time. Nevertheless, the use of water or water vapor has been demonstrated to be useful, since it does lead to formation of the unsaturated ester product.

While particular embodiments of this invention are shown above, it will be understood that the invention is obviously subject to variations and modification without departing from its broader aspects.

What is claimed is:

1. The process for the preparation of vinyl acetate which comprises sequentially contacting, at temperatures within the range of about 110° to 250° C., a feed mixture consisting of ethylene, about 5 to 40% by volume of oxygen based on ethylene and 2 to 10% by volume of water based on the total volume of ethylene and oxygen in vapor phase with (a) a carbon-supported palladium group metal-oxide or salt catalyst, and (b) an alumina-supported palladium group metal oxide or salt catalyst, and recovering a gaseous reaction mixture containing said vinyl acetate.

2. The process of claim 1 wherein said reaction is carried out at a temperature within the range of about 110° to 250° C., and a pressure within the range of about atmospheric pressure to about 400 p.s.i.

3. The process of claim 1 wherein said fed mixture contains from about 12 to 25% by volume of oxygen.

4. The process of claim 1 wherein both of said metal catalysts are palladium metal.

5. The process of claim 1 wherein said carbon-supported catalyst is activated with an admixture comprising ferric chloride and cupric chloride.

6. The process of claim 1 wherein said alumina-supported catalyst is activated with sodium acetate.

7. The process of claim 1 wherein said catalysts are activated with a vanadium salt, cobalt salt, chromium salt or manganese salt.

8. The process of claim 1 wherein the amount of water in the feed mixture ranges from about 3 to 5% by volume based on the total volume of ethylene and oxygen.

References Cited

UNITED STATES PATENTS 3,057,915 10/1962 Riemenschneider et al. 260—597
3,190,912 6/1965 Robinson _____ 260—497

FOREIGN PATENTS 648,814 4/1964 Belgium.

LORRAINE A. WEINBERGER, *Primary Examiner.*

V. GARNER, *Assistant Examiner.*

PO-1050
(5/69)

UNITED STATES PATENT OFFICE
CERTIFICATE OF CORRECTION

Patent No. 3,373,189      Dated March 12, 1968

Inventor(s) David W. Lum

It is certified that error appears in the above-identified patent and that said Letters Patent are hereby corrected as shown below:

In Claim 1, line 8 should appear as follows:

ladium group metal, oxide or salt catalyst, and (b) an

In Claim 1, line 9 should appear as follows:

alumina-supported palladium group metal, oxide or salt

SIGNED AND
SEALED
APR 21 1970

(SEAL)
Attest:

Edward M. Fletcher, Jr.
Attesting Officer

WILLIAM E. SCHUYLER, JR.
Commissioner of Patents